United States Patent
Horikoshi et al.

(10) Patent No.: US 8,803,458 B2
(45) Date of Patent: Aug. 12, 2014

(54) MOTOR DRIVE APPARATUS EQUIPPED WITH DYNAMIC BRAKING CONTROL UNIT

(71) Applicant: Fanuc Corporation, Yamanashi (JP)

(72) Inventors: Shinichi Horikoshi, Yamanashi (JP); Hiroyasu Sato, Yamanashi (JP); Minoru Kobayashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/746,718

(22) Filed: Jan. 22, 2013

(65) Prior Publication Data

US 2013/0221888 A1     Aug. 29, 2013

(30) Foreign Application Priority Data

Feb. 28, 2012 (JP) .................. 2012-041344

(51) Int. Cl.
*H02P 6/00* (2006.01)
(52) U.S. Cl.
USPC ............ 318/400.29; 318/400.01; 318/400.26; 318/700
(58) Field of Classification Search
CPC ........................................................ H02P 6/00
USPC .................. 318/400.01, 400.26, 400.29, 700
See application file for complete search history.

(56) References Cited

U.S. PATENT DOCUMENTS

| 8,054,015 B2 * | 11/2011 | Iwashita et al. ............... 318/376 |
| 2004/0160208 A1 * | 8/2004 | Youm et al. ................... 318/801 |
| 2009/0263260 A1 * | 10/2009 | Goto et al. .................. 417/410.1 |
| 2010/0085001 A1 * | 4/2010 | Akimoto ..................... 318/400.3 |
| 2011/0068728 A1 * | 3/2011 | Kuratani et al. ............... 318/490 |
| 2012/0212168 A1 * | 8/2012 | Tsukima et al. .......... 318/400.26 |

FOREIGN PATENT DOCUMENTS

| JP | 62-181684 A | 8/1987 |
| JP | 3279102 B2 | 2/2002 |
| JP | 2006-271035 A | 10/2006 |
| JP | 2012-016247 A | 1/2012 |

OTHER PUBLICATIONS

Corresponding Japanese Application No. 2012-041344 Notice of Reasons for Rejection date May 28, 2013.

* cited by examiner

*Primary Examiner* — Kawing Chan
(74) *Attorney, Agent, or Firm* — Lowe Hauptman & Ham, LLP

(57) ABSTRACT

A motor drive apparatus includes an inverter which has an upper and lower arms each provided with a plurality of semiconductor switching devices and free-wheeling diodes connected in reverse parallel with respective ones of the plurality of semiconductor switching devices, wherein the semiconductor switching devices are controlled on and off to convert DC to AC, a short-circuiting unit which includes a selector switch between motor phase windings of a synchronous motor, the selector switch being opened and closed under the control of a command, and a dynamic braking control unit which, upon reception of a dynamic braking start command, performs control so as to turn on all of the semiconductor switching devices provided in either one of the upper and lower arms and to turn off all of the semiconductor switching devices provided in the other arm, and thereafter controls the short-circuiting unit so that the selector switch is closed.

3 Claims, 12 Drawing Sheets (Prior Art)

(Prior Art)

(Prior Art)

MOTOR DRIVE APPARATUS EQUIPPED WITH DYNAMIC BRAKING CONTROL UNIT

RELATED APPLICATIONS

The present application is based on, and claims priority from, Japanese Application Number 2012-041344, filed Feb. 28, 2012, the disclosure of which is hereby incorporated by reference herein in its entirety.

BACKGROUND OF THE INVENTION

1. Field of the Invention

The present invention relates to a motor drive apparatus equipped with a dynamic braking control unit.

2. Description of the Related Art

In a motor drive apparatus for driving a synchronous motor used to drive a feed shaft of a machine tool or industrial machine or an industrial robot or the like, dynamic braking that produces a dynamic braking force by short-circuiting the motor windings of the synchronous motor is widely used in the case of an emergency stop or in an emergency such as occurrence of an alarm (warning). If electrically disconnected from the power supply, the synchronous motor which uses a permanent magnet retains a magnetic field flux, and the rotating motor acts as a generator; therefore, dynamic braking can be applied by short-circuiting the windings of the rotating motor.

In dynamic braking, from the standpoint of reducing the braking distance and braking time by generating as large a braking torque as possible, it is preferable to short-circuit the motor phase windings via a dynamic braking resistor having a resistance value that matches the characteristics of the synchronous motor so that the rotational energy of the synchronous motor can be quickly converted into Joule heat and dissipated through the dynamic braking resistor as well as the resistance of the motor windings. However, in order to short-circuit the motor windings via the dynamic braking resistor in an emergency, a switching unit for switching the connection must be provided separately from the semiconductor switching devices constituting the inverter provided for driving the synchronous motor.

FIG. 11 is a diagram showing the circuit configuration of a conventional motor drive apparatus that applies dynamic braking using mechanical contacts and resistors. FIG. 12 is an equivalent circuit diagram showing the motor drive apparatus of FIG. 11 when all the semiconductor switching devices in the inverter are turned off. FIG. 13 is a flowchart for explaining the operating principle of how dynamic braking is applied using resistors and mechanical contacts in the motor drive apparatus of FIG. 11.

As shown in FIG. 11, generally a synchronous motor 2 which uses a permanent magnet and which is driven by the motor drive apparatus 100 is supplied with AC drive power from the inverter 11 that converts the DC power supplied from the DC input side Vdc into the AC power. The inverter 11 is configured as a full-bridge inverter having an upper arm A and a lower arm B each provided, for example, with semiconductor switching devices (power transistors) and free-wheeling diode connected in reverse parallel with the respective semiconductor switching devices. A control unit 110 supplies to the inverter 11 a switching command for controlling the on/off operation of the semiconductor switching devices. With the semiconductor switching devices controlled on and off in accordance with the switching command, the inverter 11 converts the input DC to AC of a desired frequency for driving the synchronous motor 2. Though not specifically illustrated, generally a converter which converts AC supplied from a commercial AC power supply into DC for output is provided on the DC input side Vdc of the inverter 11.

Usually, a motor drive apparatus for driving a synchronous motor used to drive a feed shaft of a machine tool or industrial machine or an industrial robot or the like is equipped with a safety device for causing the motor drive apparatus to stop when an alarm occurs in order to protect the synchronous motor as well as the motor drive apparatus, for example, from a fault condition such as overcurrent or overload. The motor drive apparatus may also be provided with an emergency stop button which the user (operator) operates to cause the synchronous motor to stop when an emergency situation has occurred for some reason.

In the motor drive apparatus 100, when an emergency occurs such as an emergency stop or an alarm condition, the control unit 110 receives an alarm notification signal from the safety device or an emergency stop signal generated by operating the emergency stop button, whereupon the control unit 110 stops supplying the switching command for converting DC to AC to the semiconductor switching devices in the inverter 11, and instead supplies a switching command for applying dynamic braking to the synchronous motor 2 (hereinafter referred to as the "dynamic braking command").

The operating principle of the dynamic braking using mechanical contacts will be described below with reference to the flowchart of FIG. 13. First, in step S201 of FIG. 13, the control unit 110 in the motor drive apparatus 100 receives the emergency stop signal or the alarm notification signal. Thereupon, the control unit 110 stops outputting the switching command for converting DC to AC, and instead outputs the switching command (dynamic braking command) for applying dynamic braking to the synchronous motor 2. More specifically, in step S202, the control unit 110 outputs a command for causing all the semiconductor switches in the inverter 11 to turn off, and then, in step S203, supplies to a short-circuiting unit 112 a command for short-circuiting the motor phase windings of the synchronous motor 2.

As shown in FIGS. 11 and 12, the short-circuiting unit 112 includes a selector switch having mechanical contacts, such as a relay or a magnetic contactor, and dynamic braking resistors Ru, Rv, and Rw connected to the selector switch. When the contacts of the selector switch in the short-circuiting unit 112 are closed in step S203, the motor phase windings of the synchronous motor 2 are short-circuited via the dynamic braking resistors Ru, Rv, and Rw. Even when the inverter 11 is disconnected from the DC power supply Vdc by turning off all the semiconductor switching devices in the inverter 11 in step S202 of FIG. 13, the synchronous motor 2 which uses a permanent magnet retains the magnetic field flux; as a result, after the DC power supply Vdc is disconnected, the synchronous motor 2 rotating by inertia acts as a generator, and electromotive forces Euv, Evw, and Euw are produced. At this time, the rotational energy of the synchronous motor 2 is quickly converted into Joule heat by the dynamic braking resistors Ru, Rv, and Rw connected across the motor phase windings of the synchronous motor 2 (step S203 of FIG. 13), thus generating a dynamic braking force.

Instead of the selector switch having mechanical contacts, such as a relay or a magnetic contactor, dynamic braking according to an alternative method may use a semiconductor switching device such as a power transistor (provided separately from the semiconductor switching devices constituting the inverter) as the short-circuiting unit.

Another alternative method of dynamic braking produces a dynamic braking force by short-circuiting the motor windings of the rotating synchronous motor by utilizing the switching operation of the semiconductor switching devices constituting the inverter. According to this alternative method, each function of the dynamic braking resistors and the switching unit for switching the connection to the dynamic braking resistors is implemented by ingeniously designing the switching pattern of the semiconductor switching devices constituting the inverter 11, not by providing mechanical contacts as separate hardware as described with reference to FIGS. 11 to 13. FIG. 14 is a diagram showing the circuit configuration of a conventional motor drive apparatus that applies dynamic braking by utilizing the switching operation of the semiconductor switching devices constituting the inverter. FIG. 15 is an equivalent circuit diagram showing the motor drive apparatus of FIG. 14 when all the semiconductor switching devices in the lower arm of the inverter are turned on. FIG. 16 is a flowchart for explaining the operating principle of how dynamic braking is applied utilizing the switching operation of the semiconductor switching devices in the motor drive apparatus.

According to this method, normally the semiconductor switching devices constituting the inverter 11 are controlled on and off so as to convert DC to AC but, in the event of an emergency situation, dynamic braking is applied by turning off all the semiconductor switching devices provided in either one of the upper and lower arms A and B of the full-bridge inverter 11, while turning on all the semiconductor switching devices provided in the other arm.

The operating principle of the above dynamic braking will be described in further detail below with reference to the flowchart of FIG. 16. First, in step S301 of FIG. 16, the control unit 110 in the motor drive apparatus 100 receives the emergency stop signal or the alarm notification signal. Thereupon, the control unit 110 stops outputting the switching command for converting DC to AC, and instead outputs the switching command (dynamic braking command) for applying dynamic braking to the synchronous motor 2. More specifically, in step S302, the control unit 110 turns off all the semiconductor switching devices provided in either one of the upper and lower arms A and B (in the illustrated example, the upper arm A) of the full-bridge inverter 11, and turns on all of the semiconductor switching devices provided in the other arm (in the illustrated example, the lower arm B). As a result, the synchronous motor 2 previously connected to the respective component elements of the inverter 11 as shown in FIG. 14 is now connected as shown in FIG. 15, thus short-circuiting the motor phase windings of the rotating synchronous motor 2. When all of the semiconductor switching devices provided in the one arm (in the illustrated example, the upper arm A) are turned off, and all of the semiconductor switching devices provided in the other arm (in the illustrated example, the upper arm B) are turned on, the synchronous motor 2 rotating by inertia acts as a generator in the presence of the magnetic field flux that the synchronous motor 2 using a permanent magnet retains, and electromotive forces Euv, Evw, and Ewu are produced. At this time, the motor phase windings of the rotating synchronous motor 2 are short-circuited by the turning on of the semiconductor switching devices provided in the lower arm B of the inverter 11 (step S302 of FIG. 16) and the action of their associated freewheeling diodes. As a result, the current generated by the electromotive forces Euv, Evw, and Euw flows between the motor phase windings through the respective semiconductor switching devices in the lower arm of the inverter 11, and the rotational energy of the synchronous motor 2 is converted into Joule heat by the resistance of the motor windings, thus generating a dynamic braking force. The dynamic braking based on the switching operation of the semiconductor switching devices described with reference to FIGS. 14 to 16 is implemented by directly utilizing the circuit configuration of the DC-AC converting inverter 11; therefore, unlike the case of the dynamic braking using the mechanical contacts described with reference to FIGS. 11 to 13, the short-circuiting between the motor phase windings of the synchronous motor 2 cannot be accomplished by using resistors provided separately.

In the case of the method that applies dynamic braking by short-circuiting the motor windings of the rotating synchronous motor 2 by utilizing the switching operation of the semiconductor switching devices as described with reference to FIGS. 14 to 16, since the rotational energy of the synchronous motor 2 is converted into Joule heat by using only the resistance of the motor windings, the braking time increases compared with the case of the dynamic braking based on the mechanical contacts that uses not only the resistance of the motor windings but also the resistors.

In view of this, there is proposed, for example, as disclosed in Japanese Patent No. 3279102, a method for shortening the braking time in dynamic braking, wherein first the motor is decelerated by controlling the current flowing to the motor during dynamic braking to a constant current by controlling the on/off operation of the power transistors (semiconductor switching devices) provided in either one of the upper and lower arms of the inverter for driving the motor, and thereafter, the motor windings are short-circuited via dynamic braking resistors by closing contacts.

Generally, in the case of a selector switch having mechanical contacts, such as a relay or a magnetic contactor, the contact life in terms of the number of open/close operations is greatly dependent on the voltage applied between the contacts during the open/close operation. When switching the mechanical contacts from the open state to the closed state, a phenomenon called chattering (or bouncing), in which the two contact surfaces rapidly repeat opening and closing, occurs for a finite period of time, until the two contacts are finally brought into a stably contacting relationship, thus settling into the closed state. However, if closing the mechanical contacts is attempted while a high voltage is being applied between the contacts, a spark due to an arc discharge or glow discharge occurs between the contacts during the chattering.

In the case of the dynamic braking using the mechanical contacts described with reference to FIGS. 11 to 13, even when the inverter 11 is disconnected from the DC power supply Vdc by turning off all the semiconductor switching devices in the inverter 11 in step S202 of FIG. 13, the synchronous motor 2 which uses a permanent magnet retains the magnetic field flux; as a result, the synchronous motor 2 rotating by inertia acts as a generator, producing the electromotive forces Euv, Evw, and Euw. The electromotive forces Euv, Evw, and Euw continue to be applied between the respective mechanical contacts during the interval from the time that all the semiconductor switching devices in the inverter 11 are turned off in step S202 until the time that the motor phase windings of the synchronous motor 2 are short-circuited in step S203 by the short-circuiting unit 11. The electromotive forces Euv, Evw, and Euw are generally of the same magnitude as the voltage applied to the synchronous motor 2 when driving the synchronous motor 2, and in the case of the synchronous motor 2 for industrial use, the magnitude may reach a voltage level exceeding 400 V. If the mechanical contacts are closed in step S203 by the short-circuiting unit 11 while such a high voltage is being applied between the mechanical contacts, chattering such as described above occurs, and a spark due to an arc discharge or glow discharge is generated. Since such a spark may fuse the mechanical contacts to each other or may wear the mechanical contacts, there has been the problem that the contact life significantly degrades, increasing the maintenance cost due to frequent replacement of the contacts, etc. There has also been the problem that in order to avoid such fusing or wearing of the mechanical contacts, mechanical contact components having a large contact capacity have to be used, which not only increases the cost but also makes it difficult to reduce the size of the apparatus.

If semiconductor switching devices such as power transistors (provided separately from the semiconductor switching devices constituting the inverter) are used for the short-circuiting unit instead of the mechanical contact components such as relays or magnetic contactors, the service life problem associated with the mechanical contacts, such as described above, can be avoided. However, in this case, in addition to the dynamic braking semiconductor switches, an insulated primary power supply for operating the semiconductor switches and an insulated control circuit for on-off control of the semiconductor switches have to be provided in the short-circuiting unit; there has therefore been the problem that this method not only increases the cost but also makes it difficult to reduce the size of the apparatus, compared with the method that implements the dynamic braking using mechanical contact components such as relays or magnetic contactors.

On the other hand, the method of dynamic braking that produces a dynamic braking force by short-circuiting the motor windings of the rotating synchronous motor by utilizing the switching operation of the semiconductor switching devices constituting the inverter, as described with reference to FIGS. 14 to 16, is advantageous over the method of dynamic braking using the mechanical contacts, because there is no need to provide mechanical contacts for short-circuiting the motor windings of the synchronous motor nor is there a need to provide a circuit for driving the mechanical contacts; it also offers a further advantage in that the concern associated with the maintenance of the mechanical contacts is eliminated. However, since the rotational energy of the synchronous motor is converted into Joule heat by using only the resistance of the motor windings, there has been the problem that the braking time increases, compared with the case of the dynamic braking based on the mechanical contacts that also uses the dynamic braking resistors.

By contrast, according to the technique disclosed in Japanese Patent No. 3279102, first the motor is decelerated by controlling the current flowing to the motor during dynamic braking to a constant current by controlling the on/off operation of the power transistors (semiconductor switching devices) provided in either one of the upper and lower arms of the inverter for driving the motor, and thereafter, the motor windings are short-circuited via dynamic braking resistors by closing contacts. More specifically, in the first half of the process, the armature current is maintained constant by controlling the on/off operation of the power transistors, thereby controlling the synchronous motor to decelerate at a constant rate, and in the second half of the process, when the induced voltage of the synchronous motor decreases due to the on/off control of the power transistors, and the armature current becomes no longer constant, the on/off control of the power transistors is stopped, and the contacts of dynamic braking relays are closed to short-circuit the motor phase windings via the dynamic braking resistors.

However, according to the technique disclosed in Japanese Patent No. 3279102, when switching the process from the first half to the second half, if the contacts of the dynamic braking relay are closed while the power transistors are held in the OFF state, which means that the contacts are closed while the induced voltage is being applied, then a spark is generated, causing the contacts to be fused together or the mechanical contacts to wear, and hence the problem that the contact life significantly degrades. Furthermore, according to the technique disclosed in Japanese Patent No. 3279102, when applying dynamic braking, the power transistors are controlled on and off so as to maintain the armature current constant; this requires the provision of a dynamic braking control circuit including an armature current detector, a rectifier, an adder, a comparator, a delay, etc., and hence the problem that the circuit configuration becomes complex and the cost increases.

SUMMARY OF THE INVENTION

In view of the above problems, it is an object of the present invention to provide a motor drive apparatus that is low cost and simple in construction, and that can shorten the braking time in dynamic braking and can extend the service life of the mechanical contacts used to short-circuit the motor windings of the synchronous motor when applying dynamic braking.

A motor drive apparatus which converts DC to AC to provide drive power for driving a synchronous motor includes a full-bridge inverter which has an upper arm and a lower arm each provided with a plurality of semiconductor switching devices and free-wheeling diodes connected in reverse parallel with respective ones of the plurality of semiconductor switching devices, wherein the semiconductor switching devices provided in the upper arm and the lower arm are controlled on and off to convert DC to AC, a short-circuiting unit which includes a selector switch between motor phase windings of the synchronous motor, the selector switch being opened and closed under the control of a command, and a dynamic braking control unit which, upon reception of a dynamic braking start command, performs control so as to turn on all of the semiconductor switching devices provided in either one of the upper and lower arms and to turn off all of the semiconductor switching devices provided in the other arm, and thereafter controls the short-circuiting unit so that the selector switch is closed, thereby causing the synchronous motor to produce a decelerating torque.

The dynamic braking control unit performs control so that all of the semiconductor switching devices turned on before closing the selector switch in the short-circuiting unit are turned off after closing the selector switch.

The dynamic braking control unit may further include a setting unit which can set as desired a time interval between the time that all of the semiconductor switching devices are turned on upon reception of the dynamic braking start command and the time that all of the semiconductor switching devices are turned off after closing the selector switch.

The short-circuiting unit may further include resistors connected in series with the selector switch.

BRIEF DESCRIPTION OF THE DRAWINGS

The present invention will be more clearly understood with reference to the following accompanying drawings.

FIG. 15 is an equivalent circuit diagram showing the motor drive apparatus of FIG. 14 when all the semiconductor switching devices in a lower arm of the inverter are turned on.

DETAILED DESCRIPTION

A motor drive apparatus equipped with a dynamic braking control unit will be described below with reference to the drawings. It should, however, be understood that the present invention is not limited to the accompanying drawings, nor is it limited to the particular embodiments described herein.

Figure 1:
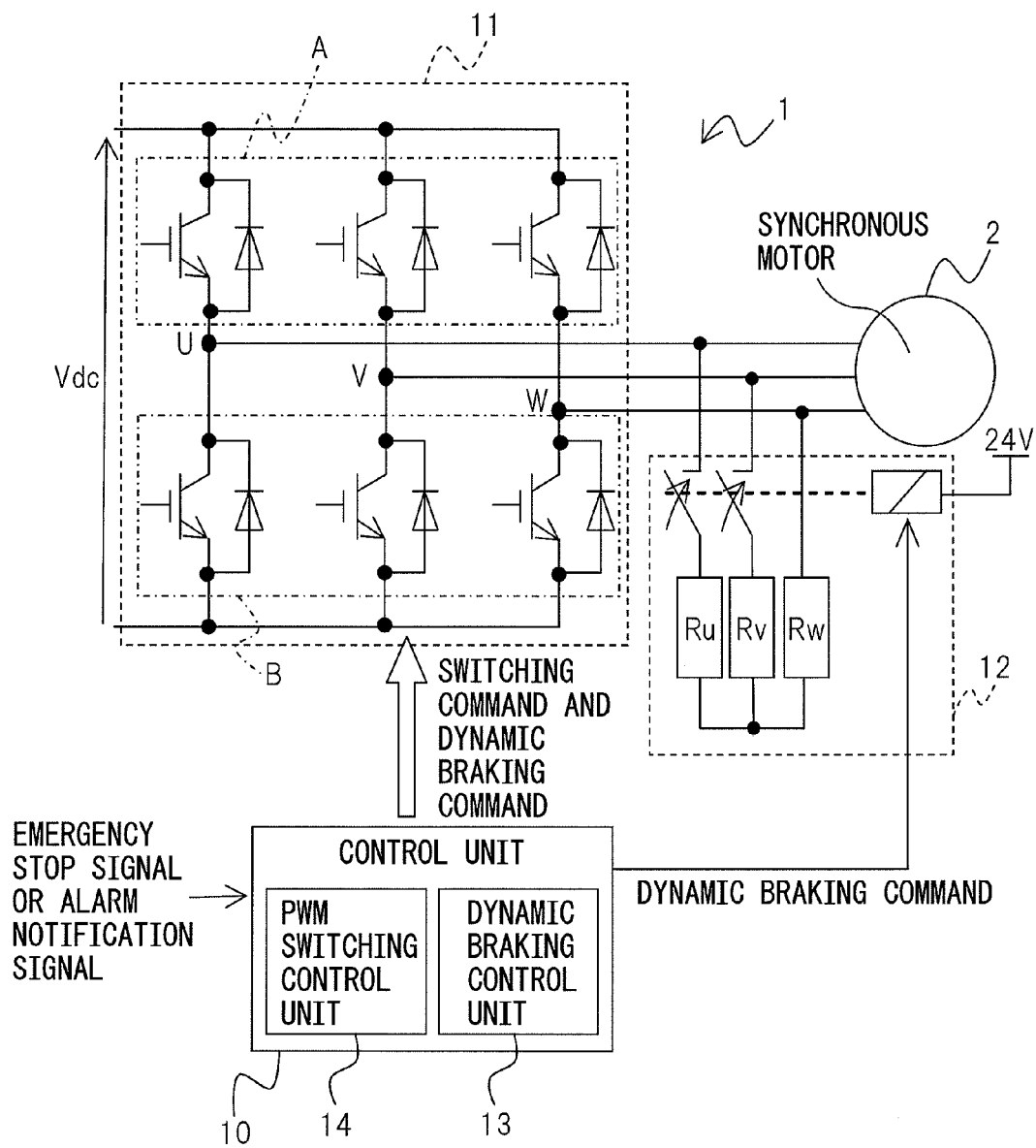
FIG. 1 is a diagram showing the circuit configuration of a motor drive apparatus.

First, the circuit configuration of the motor drive apparatus will be described. FIG. 1 is a diagram showing the circuit configuration of the motor drive apparatus. The motor drive apparatus 1 which converts DC to AC to provide drive power for driving a synchronous motor 2 includes a full-bridge inverter 11 which has an upper arm A and a lower arm B each provided with semiconductor switching devices (power transistors) and free-wheeling diodes connected in reverse parallel with the respective semiconductor switching devices, wherein the semiconductor switching devices are controlled on and off to convert DC to AC, a short-circuiting unit 12 which includes a selector switch between motor phase windings of the synchronous motor 2, the selector switch being opened and closed under the control of a command, and a dynamic braking control unit 13 which, upon reception of a dynamic braking start command such as an emergency stop signal or an alarm notification signal, performs control so as to turn on all the semiconductor switching devices provided in either one of the upper and lower arms A and B and to turn off all the semiconductor switching devices provided in the other arm, and thereafter controls the short-circuiting unit 12 so that the selector switch short-circuits the motor phase windings, thereby causing the synchronous motor 2 to produce a decelerating torque. The dynamic braking control unit 13 further performs control so that all the semiconductor switching devices turned on before closing the selector switch are turned off when a predefined period has elapsed after closing the selector switch provided in the shorting-circuiting unit 12.

Examples of the selector switch provided in the short-circuiting unit 12 include a relay and a magnetic contactor. Considering an emergency situation in which the dynamic braking control unit 13 is unable to cause the semiconductor switching devices to turn on, such as when the supply of power is cut off due to a power failure or the like, or when the dynamic braking control unit 13 or semiconductor switching device (power transistor) driving circuitry fails, it is preferable to employ normally closed contacts (b-type contacts) for a relay or a magnetic contactor as the contacts of the selector switch in the short-circuiting unit 12 from the safety point of view so that the dynamic braking will eventually work even in such an emergency situation. When such normally closed contacts are used for the selector switch in the short-circuiting unit 12, it is not possible to enjoy the benefit of protecting the contacts from the earlier described spark in an emergency situation, but since the normally closed contacts eventually close, at least the dynamic braking can be reliably made to work, so that safety can be ensured for a feed shaft of a machine tool or industrial machine or an industrial robot or the like in which the synchronous motor 2 is used.

In the illustrated example, the short-circuiting unit 12 further includes dynamic braking resistors Ru, Rv, and Rw connected in series with the selector switch. In a modified example, the short-circuiting unit 12 may not include such dynamic braking resistors Ru, Rv, and Rw, as will be described later.

As will be described in detail later, the dynamic braking control unit 13 may further include a setting unit which can set as desired the time interval between the time that all the semiconductor switching devices are turned on upon reception of the dynamic braking start command and the time that all the semiconductor switching devices are turned off after closing the selector switch in the short-circuiting unit 12; with this provision, the braking time in dynamic braking can be adjusted as desired.

Though not specifically illustrated, a converter which converts AC supplied from a commercial AC power supply into DC for output is provided on the DC input side Vdc of the inverter 11.

A PWM switching control unit 14 supplies to the inverter 11 a PWM switching command for PWM control of the semiconductor switching devices in order to convert the input DC into AC of a desired frequency for driving the synchronous motor 2.

The PWM switching control unit 14 and the dynamic braking control unit 13 together constitute a control unit 10 in the motor drive apparatus 1.

Next, the dynamic braking operation of the motor drive apparatus will be described. The following description is given by dealing with an example in which an emergency stop signal generated by operating an emergency stop button is received as the dynamic braking start command, in response to which dynamic braking is applied to the synchronous motor. The following description also applies to the case where an alarm notification signal is received from a safety device; in that case, the emergency stop signal described hereinafter need only be replaced by the alarm notification signal.

Figure 2:
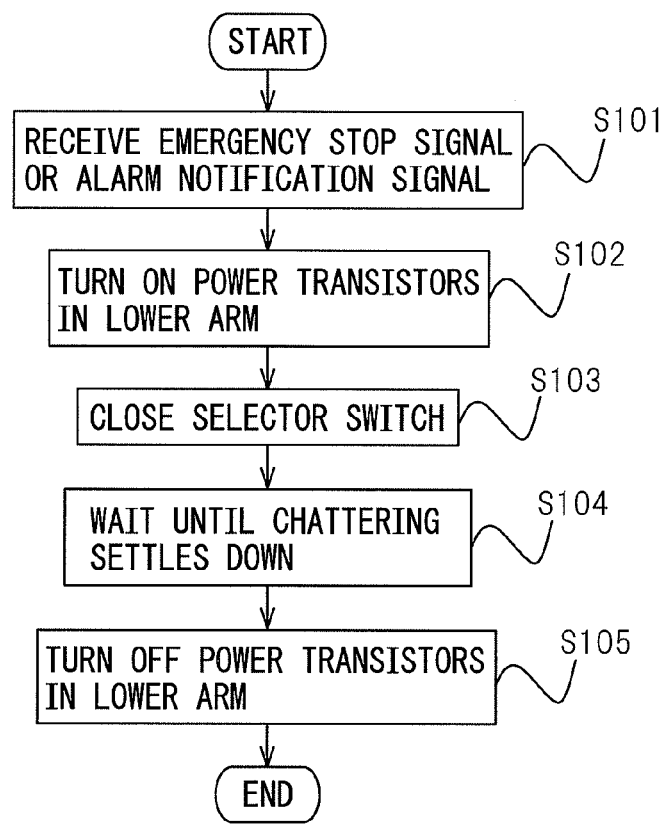
FIG. 2 is a flowchart for explaining the dynamic braking operation of the motor drive apparatus shown in FIG. 1.
Figure 3:
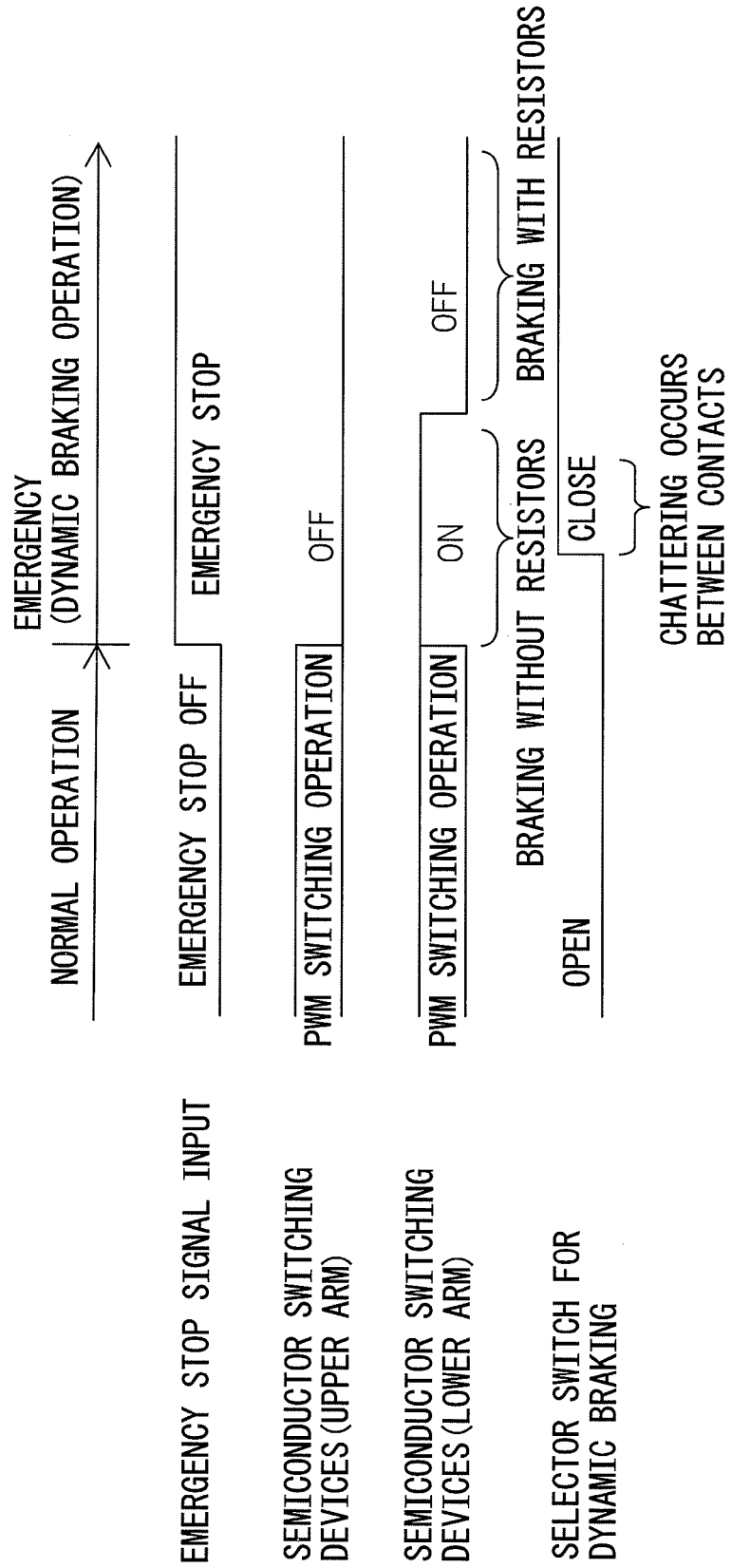
FIG. 3 is a timing chart for explaining the dynamic braking operation of the motor drive apparatus shown in FIG. 1.
Figure 4:
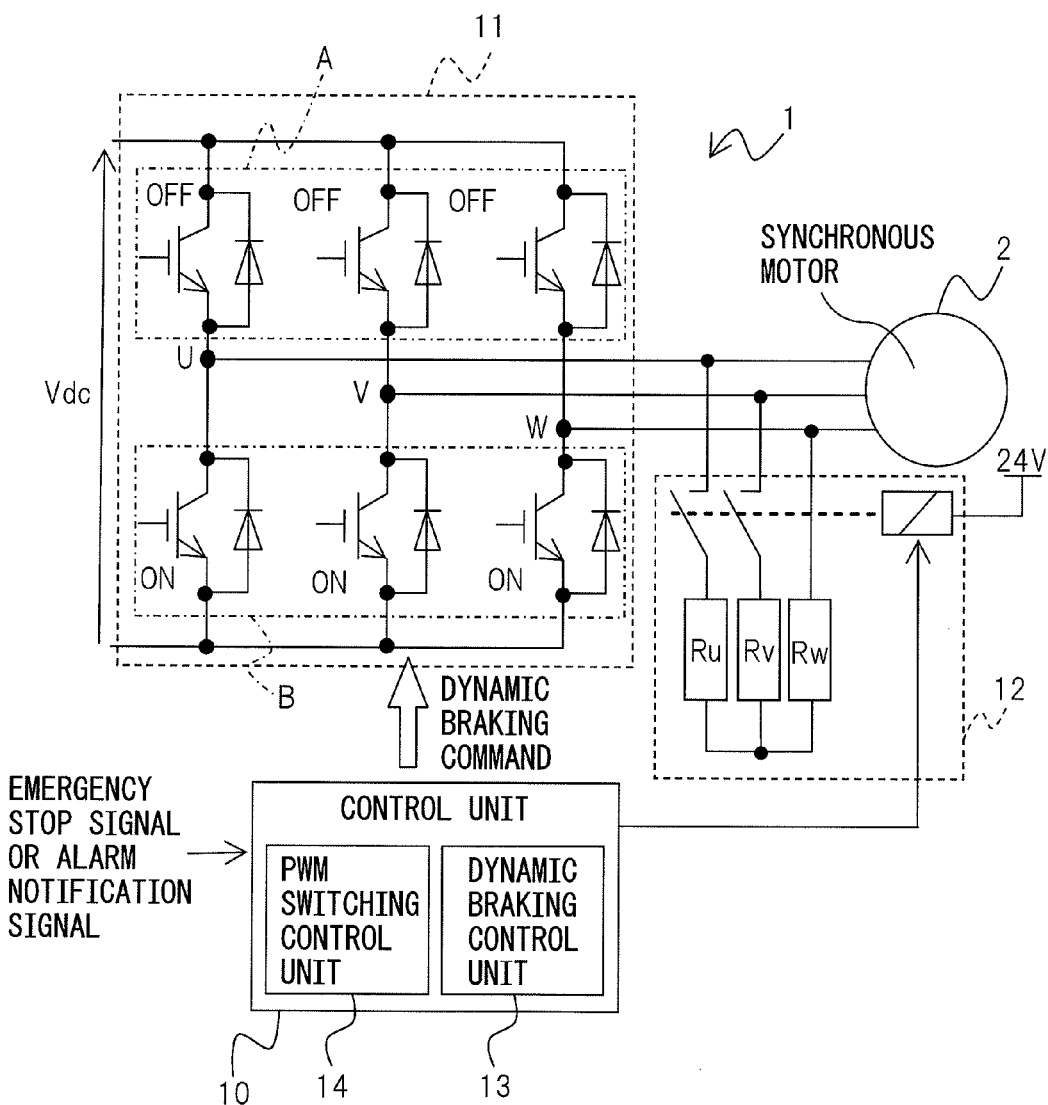
FIG. 4 is a circuit diagram for explaining the operation of various circuit component elements at various stages of the dynamic braking operation of the motor drive apparatus, and more specifically the operation of the various circuit component elements at the processing stage of step S102 in FIG. 2.
Figure 5:
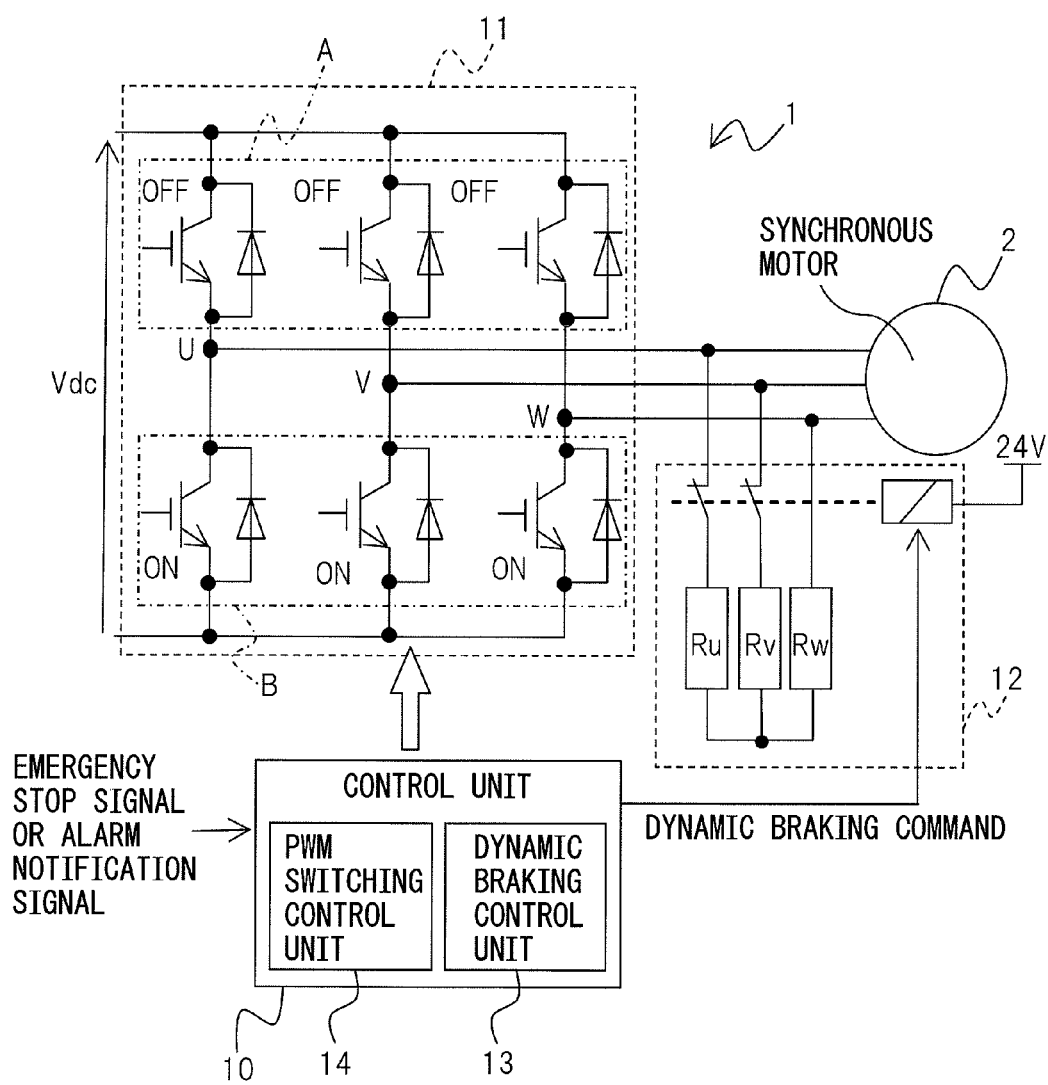
FIG. 5 is a circuit diagram for explaining the operation of various circuit component elements at various stages of the dynamic braking operation of the motor drive apparatus, and more specifically the operation of the various circuit component elements at the processing stage of step S103 in FIG. 2.
Figure 6:
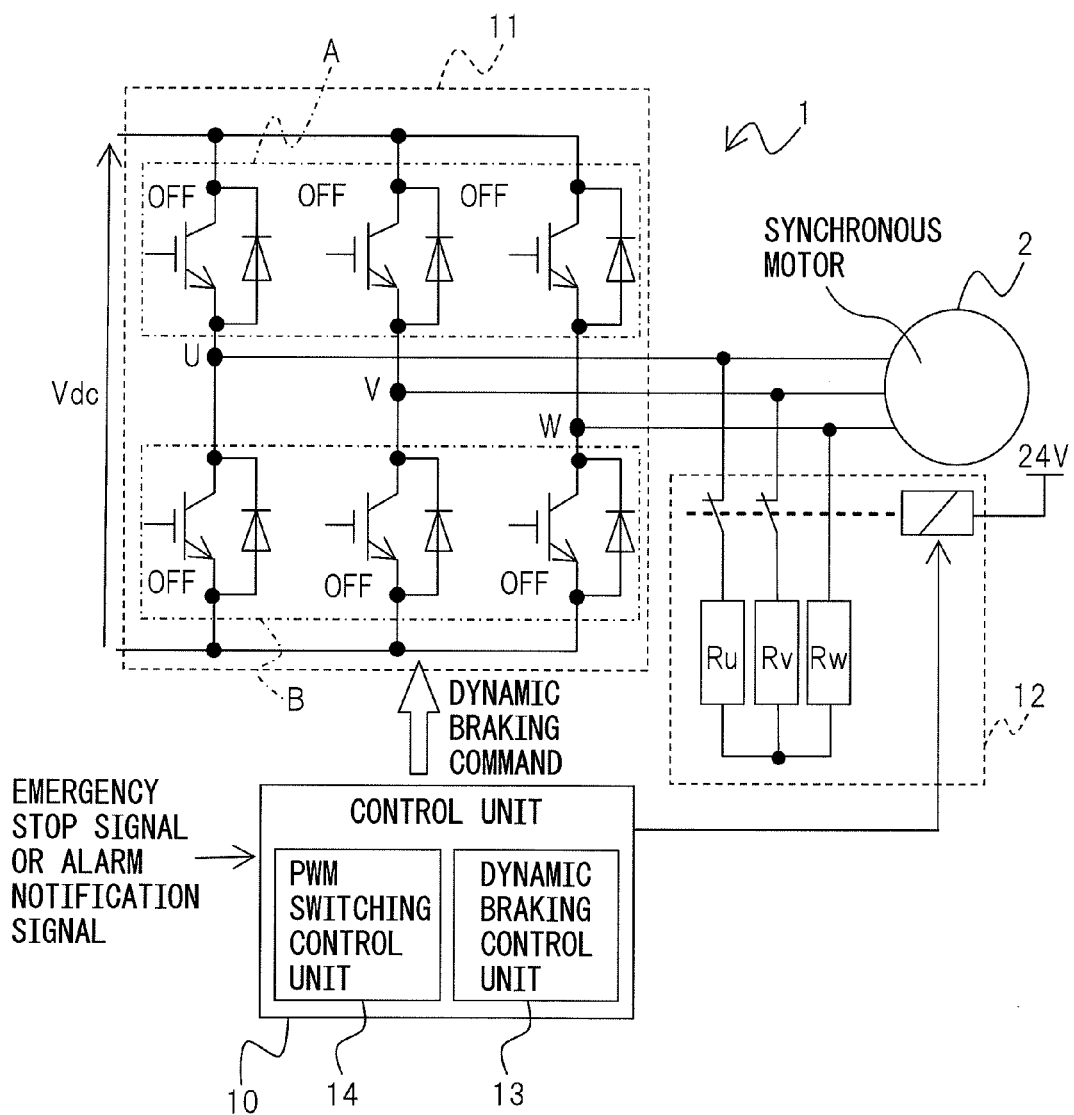
FIG. 6 is a circuit diagram for explaining the operation of various circuit component elements at various stages of the dynamic braking operation of the motor drive apparatus, and more specifically the operation of the various circuit component elements at the processing stage of step S105 in FIG. 2.
Figure 7:
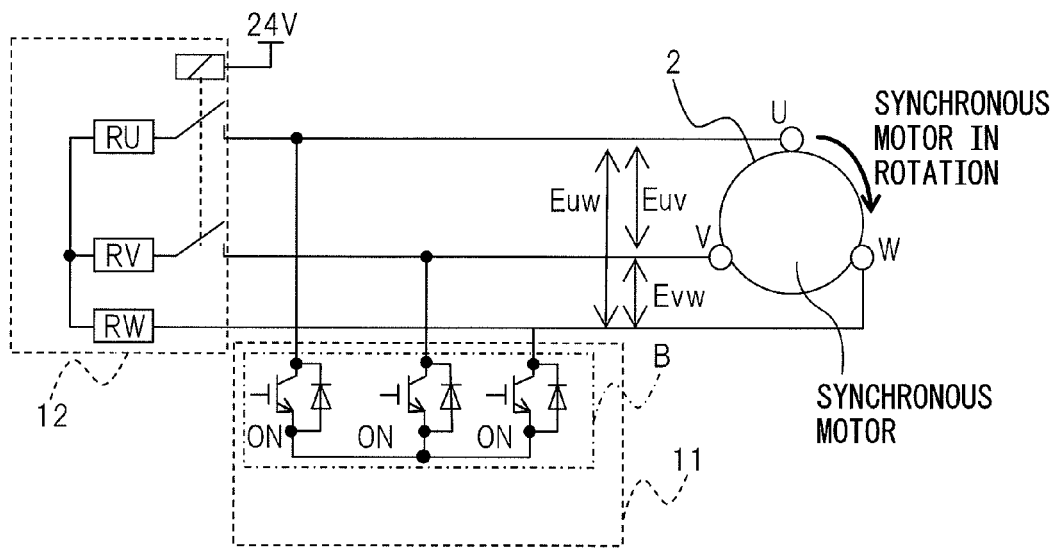
FIG. 7 is an equivalent circuit diagram corresponding to the processing stage of step S102 in FIG. 2 in the dynamic braking operation of the motor drive apparatus.
Figure 8:
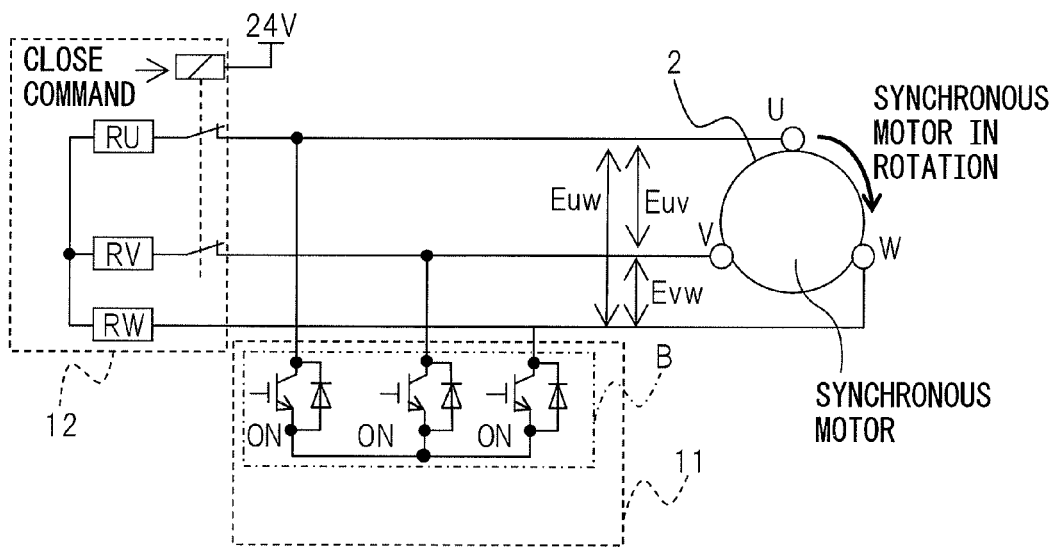
FIG. 8 is an equivalent circuit diagram corresponding to the processing stage of step S103 in FIG. 2 in the dynamic braking operation of the motor drive apparatus.
Figure 9:
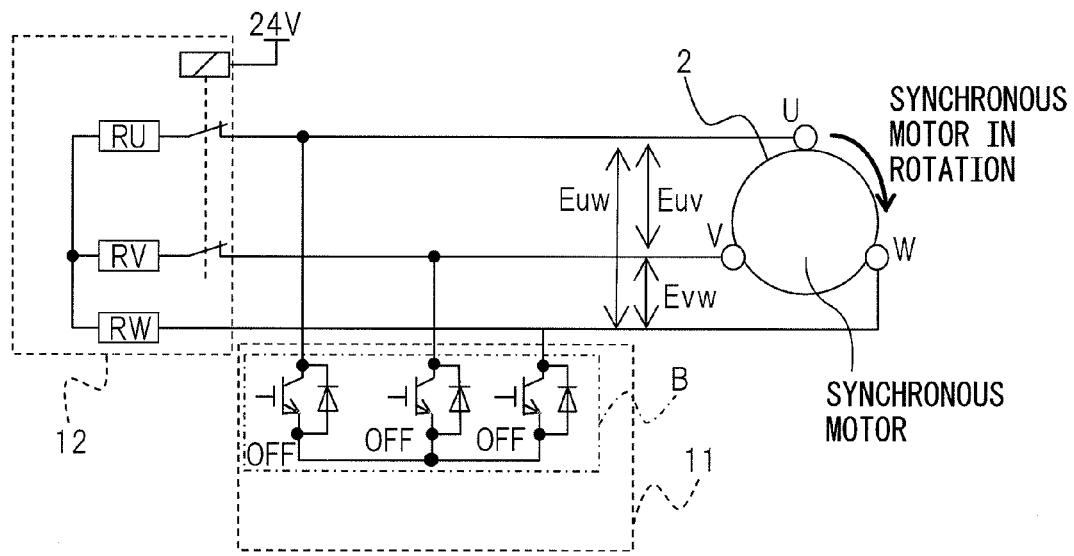
FIG. 9 is an equivalent circuit diagram corresponding to the processing stage of step S105 in FIG. 2 in the dynamic braking operation of the motor drive apparatus.
Figure 10:
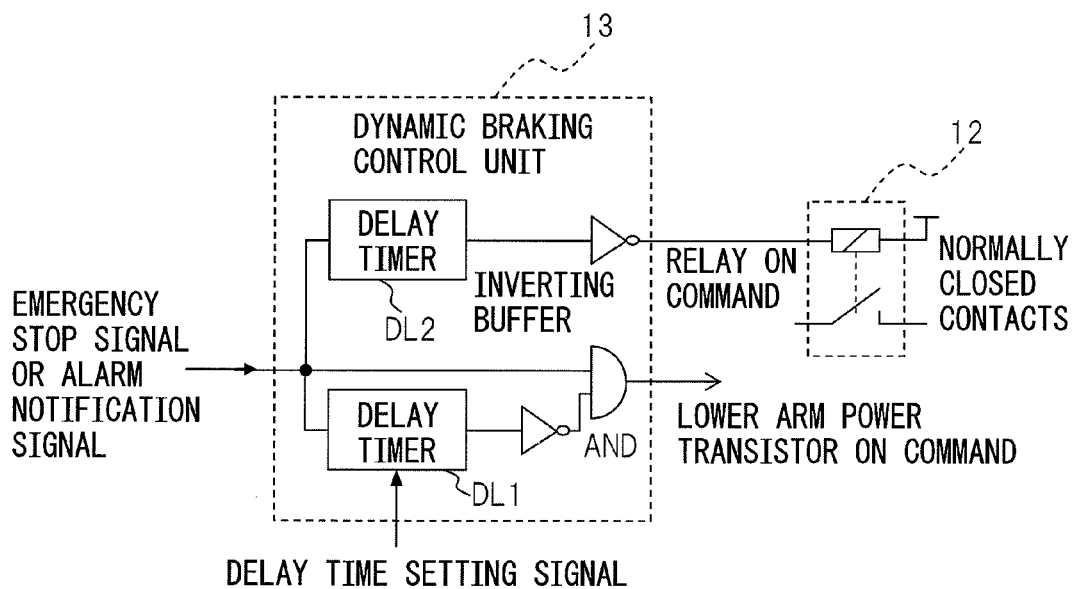
FIG. 10 is a diagram showing the configuration of a dynamic braking control unit in the motor drive apparatus.
Figure 11:
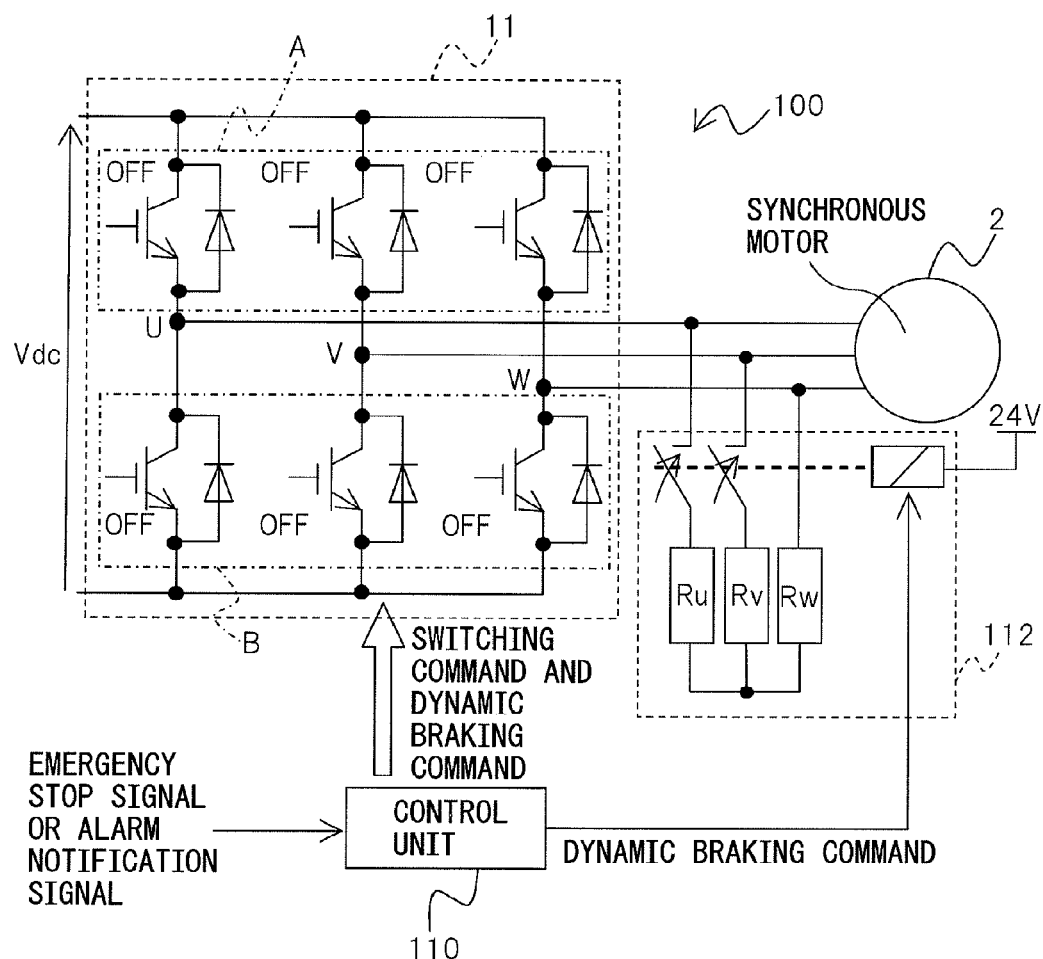
FIG. 11 is a diagram showing the circuit configuration of a conventional motor drive apparatus that applies dynamic braking using mechanical contacts and resistors.
Figure 12:
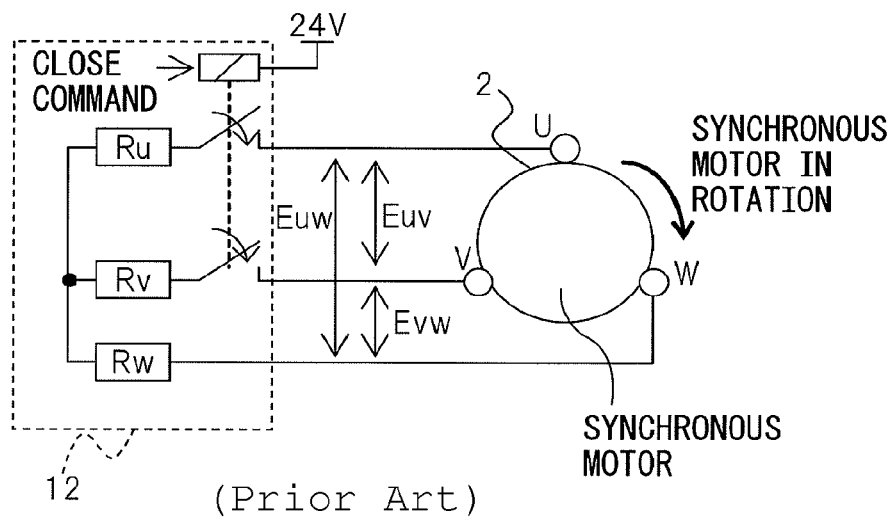
FIG. 12 is an equivalent circuit diagram showing the motor drive apparatus of FIG. 11 when all semiconductor switching devices in an inverter are turned off.
Figure 13:
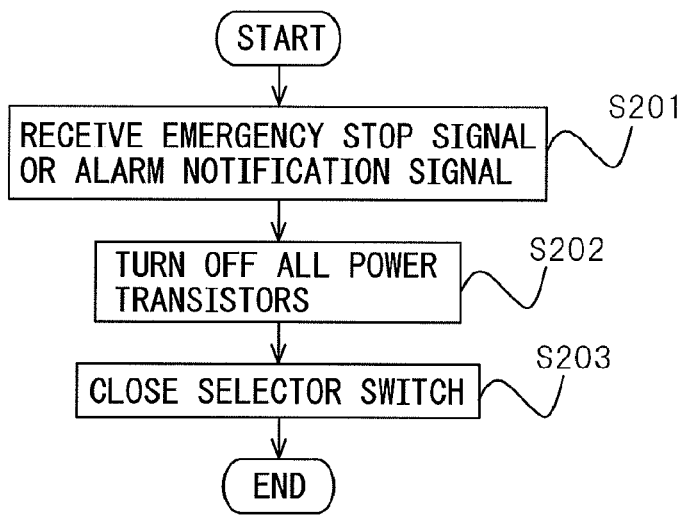
FIG. 13 is a flowchart for explaining the operating principle of how dynamic braking is applied using resistors and mechanical contacts in the motor drive apparatus of FIG. 11.
Figure 14:
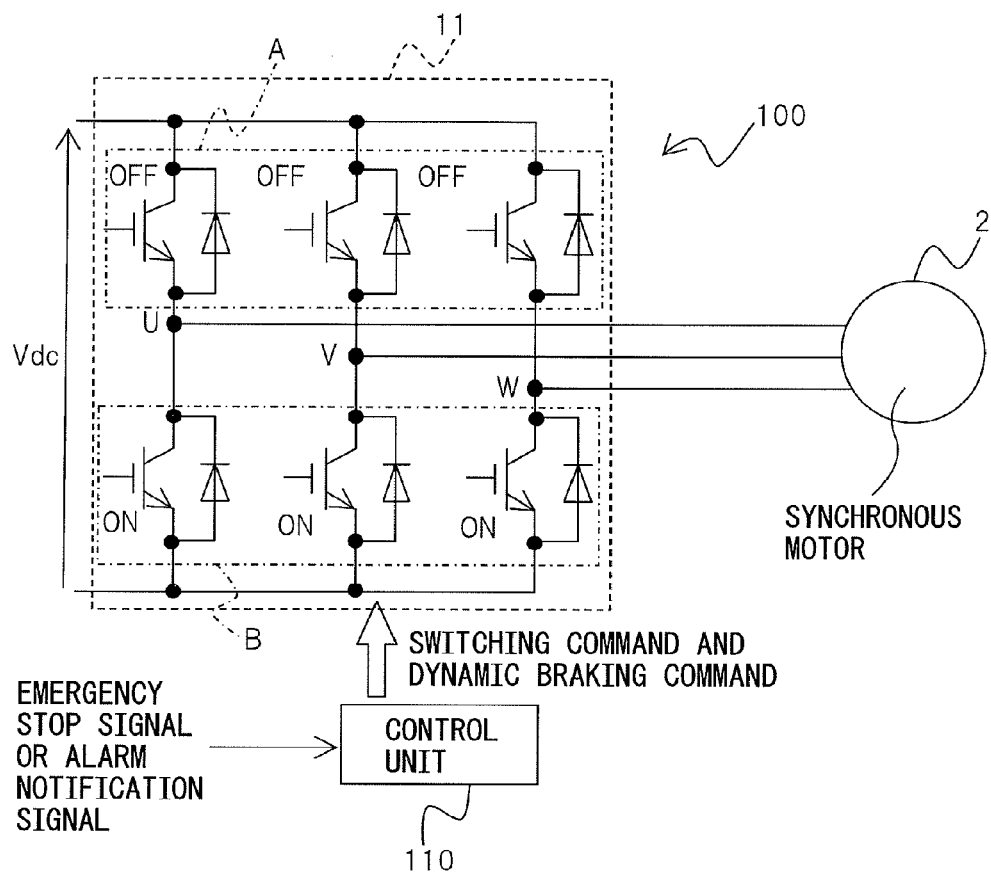
FIG. 14 is a diagram showing the circuit configuration of a conventional motor drive apparatus that applies dynamic braking by utilizing the switching operation of the semiconductor switching devices constituting the inverter.
Figure 15:
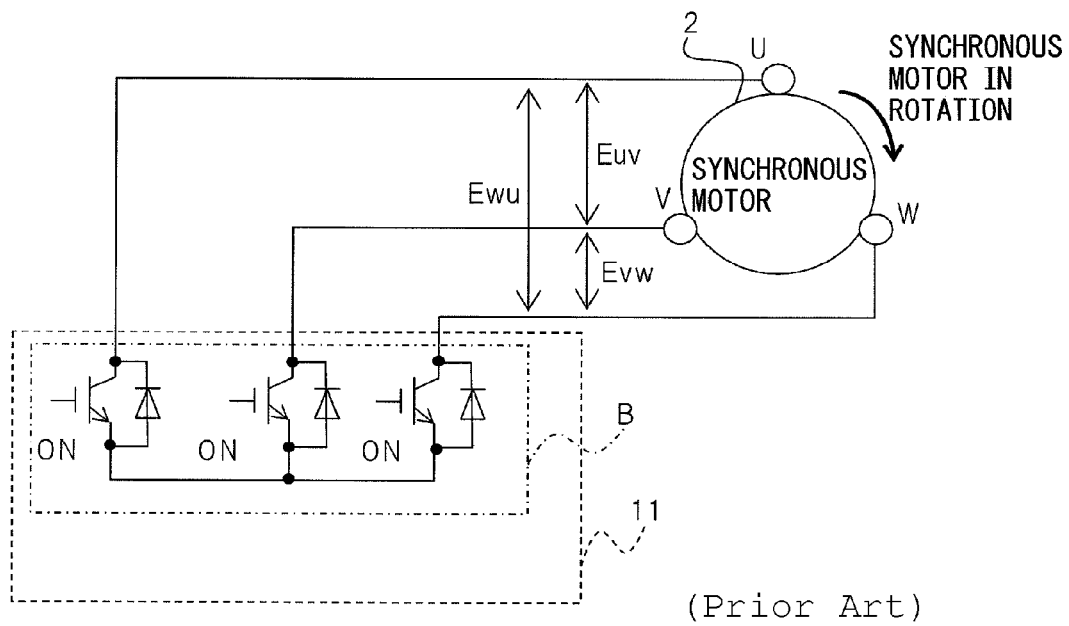
Figure 16:
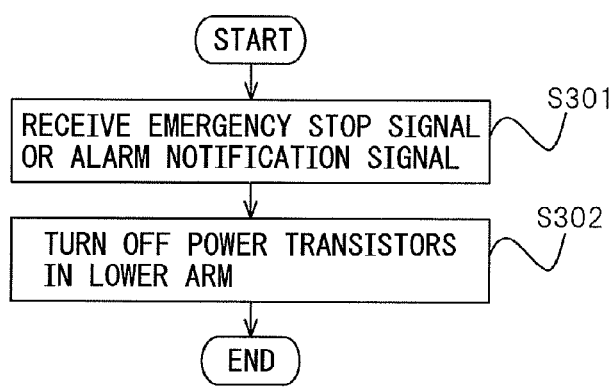
FIG. 16 is a flowchart for explaining the operating principle of how dynamic braking is applied utilizing the switching operation of the semiconductor switching devices in the motor drive apparatus.

FIG. 2 is a flowchart for explaining the dynamic braking operation of the motor drive apparatus shown in FIG. 1, and FIG. 3 is a timing chart for explaining the dynamic braking operation of the motor drive apparatus shown in FIG. 1. FIGS. 4 to 6 are circuit diagrams for explaining the operation of the various circuit component elements at various stages of the dynamic braking operation of the motor drive apparatus: FIG. 4 shows the operation of the various circuit component elements at the processing stage of step S102 in FIG. 2, FIG. 5 shows the operation of the various circuit component elements at the processing stage of step S103 in FIG. 2, and FIG. 6 shows the operation of the various circuit component elements at the processing stage of step S105 in FIG. 2. FIG. 7 is an equivalent circuit diagram corresponding to the processing stage of step S102 in FIG. 2 in the dynamic braking operation of the motor drive apparatus. FIG. 8 is an equivalent circuit diagram corresponding to the processing stage of step S103 in FIG. 2 in the dynamic braking operation of the motor drive apparatus. FIG. 9 is an equivalent circuit diagram corresponding to the processing stage of step S105 in FIG. 2 in the dynamic braking operation of the motor drive apparatus. FIG. 10 is a diagram showing the configuration of the dynamic braking control unit in the motor drive apparatus.

As shown in FIG. 3, in normal operation, the PWM switching control unit 14 in the control unit 10 supplies to the inverter 11 a switching command for on/off control of the semiconductor switching devices in order to convert the input DC into AC of a desired frequency for driving the synchronous motor 2. During this period, no emergency stop signal is input, and the semiconductor switching devices (power transistors) in the upper and lower arms A and B of the inverter 11 perform PWM switching operation in accordance with the switching command supplied from the PWM switching control unit 14. The inverter 11 thus converts the input DC into AC of the desired frequency for driving the synchronous motor 2.

When the control unit 10 in the motor drive apparatus 1 receives the emergency stop signal in step S101, the control unit 10 recognizes it as the dynamic braking start command, stops outputting the PWM switching command for DC-to-AC conversion, and instead outputs a dynamic braking command for applying dynamic braking to the synchronous motor 2.

In step S102, the dynamic braking control unit 13 in the control unit 10 supplies to the inverter 11 a dynamic braking command that performs control so as to turn on all the semiconductor switching devices provided in either one of the upper and lower arms A and B of the inverter 11 and to turn off all of the semiconductor switching devices provided in the other arm, as shown in FIGS. 3 and 4. In the illustrated example, control is performed to turn on all of the semiconductor switching devices provided in the lower arm B of the inverter 11 and to turn off all the semiconductor switching devices provided in the upper arm A.

The equivalent circuit corresponding to the processing stage of step S102 is shown in FIG. 7. The motor phase windings of the synchronous motor 2 are short-circuited by the turning on of all the semiconductor switching devices in the lower arm B in conjunction with the action of the free-wheeling diodes connected in reverse parallel with the respective semiconductor switching devices in the lower arm B. The synchronous motor 2 rotating by inertia acts as a generator in the presence of the magnetic field flux that the synchronous motor 2 using a permanent magnet retains, and electromotive forces Euv, Evw, and Euw are produced; the current generated by the electromotive forces Euv, Evw, and Euw flows through the dynamic braking resistors Ru, Rv, and Rw, and the rotational energy of the synchronous motor 2 is converted into Joule heat by the resistance of the motor windings, thus generating a dynamic braking force.

At the processing stage of step S102, the voltage applied between the contacts of the selector switch in the short-circuiting unit 12 is equal to the difference between the voltage drop that occurs along the connecting lines from the semiconductor switching devices to the contacts by the armature current flowing due to the electromotive forces Euv, Evw, and Euw and the sum of the ON voltage of the semiconductor switching devices in the lower arm B and the forward voltage of the free-wheeling diodes; therefore, compared with the previously described prior art method that applies dynamic braking by turning off all the semiconductor switching devices, the magnitude of the voltage applied between the contacts of the selector switch in the short-circuiting unit 12 can be greatly reduced.

Next, in step S103, the dynamic braking control unit 13 in the control unit 10 supplies to the short-circuiting unit 12 a dynamic braking command that controls the short-circuiting unit 12 to short-circuit the motor phase windings of the synchronous motor 2 via the dynamic braking resistors Ru, Rv, and Rw, as shown in FIGS. 3 and 5. As earlier described, the short-circuiting unit 12 incorporates the selector switch that makes or breaks the paths between the respective motor phase windings of the synchronous motor 2 in accordance with the command from the dynamic braking control unit 13, and in step S103, the contacts of the selector switch in the short-circuiting unit 12 are closed in accordance with the dynamic braking command received from the dynamic braking control unit 13 that directs short-circuiting the motor phase windings of the synchronous motor 2. At the processing stage of step S103, since all the semiconductor switching devices provided in the lower arm B of the inverter 11 remain in the ON state, the magnitude of the voltage applied between the contacts of the selector switch in the short-circuiting unit 12 is significantly small as described above. With the voltage between the contacts thus held to a small level, the contacts of the selector switch in the short-circuiting unit 12 are closed in step S103.

The equivalent circuit corresponding to the processing stage of step S103 is shown in FIG. 8. Since the resistance of the dynamic braking resistors Ru, Rv, and Rw is greater in value than the internal resistance of the lower arm B of the inverter 11, the current generated by the electromotive forces Euv, Evw, and Ewu flows through the lower arm B of the inverter 11. When the contacts of the selector switch in the short-circuiting unit 12 are closed in step S103, since the motor phase windings of the synchronous motor 2 are short-circuited via the semiconductor switching devices provided in the lower arm B of the inverter, the dynamic braking effected by short-circuiting the motor phase windings of the synchronous motor 2 without using the dynamic braking resistors Ru, Rv, and Rw is maintained.

When the contacts of the selector switch in the short-circuiting unit 12 are closed in step S103, chattering occurs between the contacts (FIG. 3). Therefore, in step S104, the dynamic braking control unit 13 waits a finite amount of time until the chattering settles down, thus preventing the occurrence of a spark between the contacts of the selector switch in the short-circuiting unit 12. Details of the waiting time will be described in connection with the subsequent step S105.

After the motor phase windings of the synchronous motor 2 are short-circuited by the short-circuiting unit 12 in step S103, the process waits a finite amount of time until the chattering settles down (step S104); then, in step S105, the dynamic braking control unit 13 in the control unit 10 supplies to the inverter 11 a dynamic braking command that perform control so that all the semiconductor switching devices turned on in step S102 before short-circuiting the motor windings of the synchronous motor 2 are now turned off. In the illustrated example, since all the semiconductor switching devices provided in the lower arm B of the inverter 11 are turned on in step S102, all the semiconductor switching devices provided in the lower arm B are turned off in step S105.

The equivalent circuit corresponding to the processing stage of step S105 is shown in FIG. 9. Since all the semiconductor switching devices provided in the lower arm B of the inverter 11 are turned off, the motor phase windings of the synchronous motor 2 are now short-circuited via the dynamic braking resistors Ru, Rv, and Rw. The synchronous motor 2 rotating by inertia acts as a generator in the presence of the magnetic field flux that the synchronous motor 2 using a permanent magnet retains, and electromotive forces Euv, Evw, and Ewu are produced; the current generated by the electromotive forces Euv, Evw, and Ewu flows through the dynamic braking resistors Ru, Rv, and Rw, and the rotational energy of the synchronous motor 2 is converted into Joule heat by the dynamic braking resistors Ru, Rv, and Rw, thus generating a dynamic braking force. In this way, when all the semiconductor switching devices provided in the lower arm B of the inverter 11 are turned off, the dynamic braking is now achieved by short-circuiting the motor phase windings of the synchronous motor 2 via the dynamic braking resistors Ru, Rv, and Rw. In the case of the dynamic braking using the dynamic braking resistors Ru, Rv, and Rw, if the resistance values of the dynamic braking resistors Ru, Rv, and Rw are optimally set in advance to match the characteristics of the synchronous motor 2, the dynamic braking distance and braking time for the synchronous motor 2 can be reduced.

Before proceeding to the processing stage of step S105, the dynamic braking control unit 13 waits a finite amount of time in step S104 until the chattering settles down, as earlier described. Since the amount of time taken from the moment the contacts of the selector switch in the short-circuiting unit 12 are closed until the chattering finally settles down depends on the specifications of the selector switch such as a relay or magnetic contactor used, the maximum duration time of chattering is measured in advance by experiment on the relay or magnetic contactor used, and the "waiting time" between the time the contacts of the selector switch are closed in step S103 and the time the semiconductor switching devices are turned off in step S105 is set equal to or longer than the maximum duration time of chattering. After the chattering between the contacts of the selector switch has completely settled down, and the contacts are brought into a stably and firmly contacting relationship, all of the semiconductor switching devices turned on in step S102 before short-circuiting the motor windings of the synchronous motor 2 are turned off in step S105; this serves to prevent a spark from being generated between the contacts as was the case with the prior art.

In this way, the dynamic braking operation of the motor drive apparatus 1 is performed in two stages: the dynamic braking that does not use the dynamic braking resistors Ru, Rv, and Rw (steps S103 and S104 in FIG. 2), and the dynamic braking that uses the dynamic braking resistors Ru, Rv, and Rw (step S105 in FIG. 2). By suitably adjusting the timing for switching the dynamic braking operation from the first to the second stage, the dynamic braking that achieves the desired braking distance and braking time can be applied to the synchronous motor 2, while protecting the contacts of the selector switch in the short-circuiting unit 12 by preventing the generation of a spark between the contacts. Adjusting the timing for switching the dynamic braking operation from the first to the second stage can be accomplished by providing a setting unit that can set as desired the time interval between the time that all of the semiconductor switching devices are turned on upon reception of the dynamic braking start command and the time that all of the semiconductor switching devices are turned off after closing the selector switch in the short-circuiting unit 12, as will be described in detail later. Depending, for example, on the application of the machine such as the feed shaft of a machine tool or industrial machine or an industrial robot in which the synchronous motor 2 is used, too large a deceleration torque may damage the machine, but the present invention can be applied advantageously to such machines, because dynamic braking with adjustable braking distance and braking time can be achieved.

In the above embodiment, provisions have been made to short-circuit the motor phase windings via the dynamic braking resistors Ru, Rv, and Rw when the contacts of the selector switch in the short-circuiting unit 12 are closed, but as an modified example, the dynamic braking resistors Ru, Rv, and Rw may be omitted from the short-circuiting unit 12, and provisions may be made to short-circuit the motor phase windings directly when the contacts of the selector switch in the short-circuiting unit 12 are closed. For example, depending on the application of the machine such as the feed shaft of a machine tool or industrial machine or an industrial robot in which the synchronous motor 2 is used, requirements on the braking distance and braking time of the synchronous motor 2 may not be stringent, and in the case of the motor drive apparatus used in such machines, it is advantageous in terms of size and cost if provisions are made to short-circuit the motor phase windings directly without using the dynamic braking resistors Ru, Rv, and Rw.

As described with reference to FIG. 3, the operation of the dynamic braking control unit 13 involves only turning on the semiconductor switching devices in one predetermined arm upon reception of the emergency stop signal or alarm notification signal and turning off the thus turned on semiconductor switching devices after the contacts of the selector switch in the short-circuiting unit 12 have been closed; i.e., the operation is quite simple since it can be accomplished by simply turning on and then off the semiconductor switching devices, while in the meantime, turning on the contacts of the selector switch in the short-circuiting unit 12 only once at a predetermined timing. Accordingly, when implementing the dynamic braking control unit 13 in hardware, it can be achieved with quite simple circuitry that includes two delay timers, as shown in FIG. 10. On the other hand, when the dynamic braking control unit 13 is implemented using a microcomputer, since the operation of the dynamic braking control unit 13 can be implemented by software, the present invention can be applied to any existing motor drive apparatus without having to provide additional hardware.

As earlier described, the dynamic braking control unit 13 may further include a setting unit which can set as desired the time interval between the time that all the semiconductor switching devices are turned on upon reception of the dynamic braking start command and the time that all the semiconductor switching devices are turned off after short-circuiting the motor phase windings of the synchronous motor 2. The setting unit will be described in further detail with reference to FIG. 10. The delay timer DL1 shown in FIG.

10 is a timer for adjusting the time interval between the time that the semiconductor switching devices in one arm are turned on upon reception of the emergency stop signal and the time that the thus turned on semiconductor switching devices are turned off. This timer set time can be set as desired by an externally applied delay time setting signal. However, this timer set time should be adjusted in advance so that it does not at least become shorter than the maximum duration time of chattering of the short-circuiting unit 12 (e.g., a relay or magnetic contactor) used; by so doing, the contacts can be protected reliably, even when the timer is set to the shortest time.

On the other hand, the delay timer DL2 shown in FIG. 10 is a timer for adjusting the time interval between the time that the semiconductor switching devices in one arm are turned on upon reception of the emergency stop signal and the time that the selector switch, i.e., the mechanical contact component in the short-circuiting unit 12, is turned off. Generally, the delay time for the semiconductor switching devices as power transistors to turn on is on the order of several microseconds, while the time taken to close the selector switch, i.e., the mechanical contact component in the short-circuiting unit 12, is on the order of several milliseconds, which is significantly longer than the delay time of the switching operation of the semiconductor switching devices. If a mode of operation such that the contacts of the selector switch in the short-circuiting unit 12 are closed after the semiconductor switching devices in one arm have been turned on by receiving the emergency stop signal can be realized, then the delay timer DL2 may be omitted, and a signal for closing the contacts of the selector switch in the short-circuiting unit 12 may be output upon reception of the emergency stop signal. Even if the signal for closing the contacts of the selector switch is output upon reception of the emergency stop signal, since the delay of the mechanical contact component such as a relay is large, the contacts will close after a finite delay; therefore, the delay timer DL2 can be omitted without causing any problem.

Next, a comparison is made between the present invention and the technique disclosed in Japanese Patent No. 3279102. According to the present invention, all of the semiconductor switching devices (power transistors) provided in either one of the upper and lower arms of the full-bridge inverter are turned on, while turning off all of the semiconductor switching devices provided in the other arm, and thereafter the contacts of the mechanical contact component used to short-circuit the motor windings of the synchronous motor are closed; since all of the semiconductor switching devices provided in the one arm are held in the ON state for a finite period of time until the chattering between the contacts settles down, and thereafter the semiconductor switching devices thus held in the ON state are turned off, it is possible to prevent the fusing or wearing of the mechanical contacts by preventing the generation of a spark when the mechanical contacts are closed, and consequently, the service life of the mechanical contacts can be greatly extended. On the other hand, according to the technique disclosed in Japanese Patent No. 3279102, there is the possibility that the contacts of the dynamic braking relay may be closed while the power transistors are in the OFF state, and if this happens, a spark is generated, resulting in the fusing or wearing of the mechanical contacts, hence the shortcoming that the contact life significantly degrades.

Furthermore, according to the present invention, the operation simply involves turning on the semiconductor switching devices in one predetermined arm upon reception of the emergency stop signal or alarm notification signal and turning off the thus turned on semiconductor switching devices after the contacts of the selector switch in the short-circuiting unit 12 have been closed; i.e., the operation is quite simple since it can be accomplished by simply turning on and then off the semiconductor switching devices, while in the meantime, turning on the contacts of the selector switch in the short-circuiting unit 12 only once at a predetermined timing. Therefore, the dynamic braking control unit 13 can be implemented at low cost with simple circuitry. On the other hand, according to the technique disclosed in Japanese Patent No. 3279102, when applying dynamic braking, the power transistors are controlled on and off so as to maintain the armature current constant; this requires the provision of a dynamic braking control circuit including an armature current detector, a rectifier, an adder, a comparator, a delay, etc., and hence the problem that the circuit configuration becomes complex and the cost increases.

The present invention can be applied for dynamic braking control in a motor drive apparatus that drives a synchronous motor used to drive a feed shaft of a machine tool or industrial machine or an industrial robot or the like.

According to the present invention, a motor drive apparatus can be achieved that is low cost and simple in construction, and that can shorten the braking time in dynamic braking and can extend the service life of the mechanical contacts used to short-circuit the motor windings of the synchronous motor when applying dynamic braking.

According to the present invention, all of the semiconductor switching devices (power transistors) provided in either one of the upper and lower arms of the full-bridge inverter that supplies AC drive power to the synchronous motor are turned on, while turning off all of the semiconductor switching devices provided in the other arm, and thereafter the contacts of the mechanical contact component used to short-circuit the motor windings of the synchronous motor are closed; since all of the semiconductor switching devices provided in the one arm are held in the ON state until the chattering between the contacts settles down, and thereafter the semiconductor switching devices thus held in the ON state are turned off, as earlier described, it is possible to prevent the fusing or wearing of the mechanical contacts by preventing the generation of a spark when the mechanical contacts are closed. As a result, the service life of the mechanical contacts can be greatly extended. Further, by connecting the dynamic braking resistors in series with the mechanical contacts, the braking distance and braking time in dynamic braking can be further shortened.

Furthermore, since the dynamic braking is achieved by quite a simple operation that involves only turning on and then off the semiconductor switching devices, while in the meantime, turning on the contacts of the selector switch in the short-circuiting unit only once at a predetermined timing, the motor drive apparatus equipped with the dynamic braking control unit can be achieved at low cost with simple circuitry.

Further, control is performed so that all of the semiconductor switching devices turned on before short-circuiting the motor windings are turned off after the motor phase windings have been short-circuited by the action of the contacts of the mechanical contact components; the motor drive apparatus may further include a setting unit that can set as desired the time interval between the time that all the semiconductor switching devices are turned on upon reception of the dynamic braking start command and the time that all of the semiconductor switching devices are turned off after short-circuiting the motor phase windings, and in this case, the braking distance and braking time in dynamic braking can be adjusted as desired.

If there is no need to specifically limit the braking distance, the motor phase windings may be short-circuited without using the dynamic braking resistors; in this case, a further compact and low-cost motor drive apparatus can be achieved.

What is claimed is:

1. A motor drive apparatus which converts DC to AC to provide drive power for driving a synchronous motor, comprising:
a full-bridge inverter which has an upper arm and a lower arm each provided with a plurality of semiconductor switching devices and free-wheeling diodes connected in reverse parallel with respective ones of said plurality of semiconductor switching devices, wherein said semiconductor switching devices provided in said upper arm and said lower arm are controlled on and off to convert DC to AC;
a short-circuiting unit which includes a selector switch between motor phase windings of said synchronous motor, said selector switch being opened and closed under the control of a command; and
a dynamic braking control unit which, upon reception of a dynamic braking start command, performs control so as to turn on all of said semiconductor switching devices provided in either one of said upper arm and said lower arm and to turn off all of said semiconductor switching devices provided in the other arm, and thereafter controls said short-circuiting unit so that said selector switch is closed, and further, after closing said selector switch, performs control so that all of said semiconductor switching devices turned on before closing said selector switch are turned off when a finite amount of time until the chattering between contacts of said selector switch settles down has elapsed, and thereafter said synchronous motor produces a decelerating torque.

2. The motor drive apparatus according to claim 1, wherein said dynamic braking control unit further includes a setting unit to set a desired time interval between the time at which all of said semiconductor switching devices are turned on upon reception of said dynamic braking start command and the time at which all of said semiconductor switching devices are turned off after closing said selector switch.

3. The motor drive apparatus according to claim 1, wherein said short-circuiting unit further includes resistors connected in series with said selector switch.

* * * * *